United States Patent [19]

Afdasta

[11] 4,433,903
[45] Feb. 28, 1984

[54] REMOTE CONTROLLED CAMERA OPERATING DEVICE

[76] Inventor: Nader Afdasta, 30 Viking Dr., Bristol, R.I. 02809

[21] Appl. No.: 418,307

[22] Filed: Sep. 15, 1982

[51] Int. Cl.³ .............................................. G03B 17/38
[52] U.S. Cl. ...................................... 354/266; 354/81; 352/179
[58] Field of Search ................ 354/67, 131, 173, 266, 354/267, 268, 269, 81; 352/179

[56] References Cited

U.S. PATENT DOCUMENTS

| | | | |
|---|---|---|---|
| 2,679,186 | 5/1954 | Schulte | 352/179 |
| 3,195,433 | 7/1965 | Fernald | 354/269 |
| 4,180,316 | 12/1979 | Della-Calce | 354/173 |
| 4,330,184 | 5/1982 | Fattore et al. | 354/266 |
| 4,383,744 | 5/1983 | O'Connell | 354/173 |

*Primary Examiner*—A. A. Mathews
*Attorney, Agent, or Firm*—Robert J. Doherty

[57] ABSTRACT

A device for the remote actuation of a camera having a depressible shutter control button. Included is a housing supporting a drive means operable upon a remote signal which in turn actuates a pivotal lever arm to which a plate having an actuation pin is attached. The housing provides support for the camera such that the depressible button may be disposed adjacent the actuation pin.

8 Claims, 5 Drawing Figures

REMOTE CONTROLLED CAMERA OPERATING DEVICE

BACKGROUND AND OBJECTS OF THE INVENTION

This invention relates to a device for operating a camera from a remote location and more particularly is adapted for sequential picture-taking operation with those cameras having a built-in or attached film motor drives. Devices for remotely controlling cameras, especially hidden cameras such as frequently used for surveilance in banks or other high security areas are known. Such devices are normally complicated and expensive enough to rule them out as an accessory for amateur photographers. Also known are remote-controlled devices which are attached or connected to cameras and are either hand-held as in the case of a release wire or built into the camera in the case of a time release spring. In either case with these latter type devices, the distance at which they can be operated is limited, that is, the device must either be hand-held or the person taking the picture must set a time lever and then run around to the front of the camera in order to be in the picture. Accordingly, both such devices have undesirable limitations.

It is, accordingly, an object of the present invention to avoid these above-indicated prior art shortcomings and provide a truly flexible yet low cost and widely usable device which provides for actuation of a camera upon the signal of the operator but at a remote location from the camera. These and other objects of the present invention are accomplished by a device which is adapted to support a wide variety of cameras in such a position that the shutter actuation button thereof is placed in such a position that it can be depressed by a movable member (i.e., a pin) also supported by the housing of the device upon a predetermined signal such as a radio frequency signal transmitted to a drive means also supported by the housing. An actuation pin is in turn supported by a plate which in turn is longitudinally adjustable with respect to a lever arm mechanism in turn operated by the drive means. Accordingly, in this way essentially a wide variety of different cameras may be utilized in conjunction with the device, thereby giving broad utility yet at a cost which is normally affordable by the amateur photographer.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
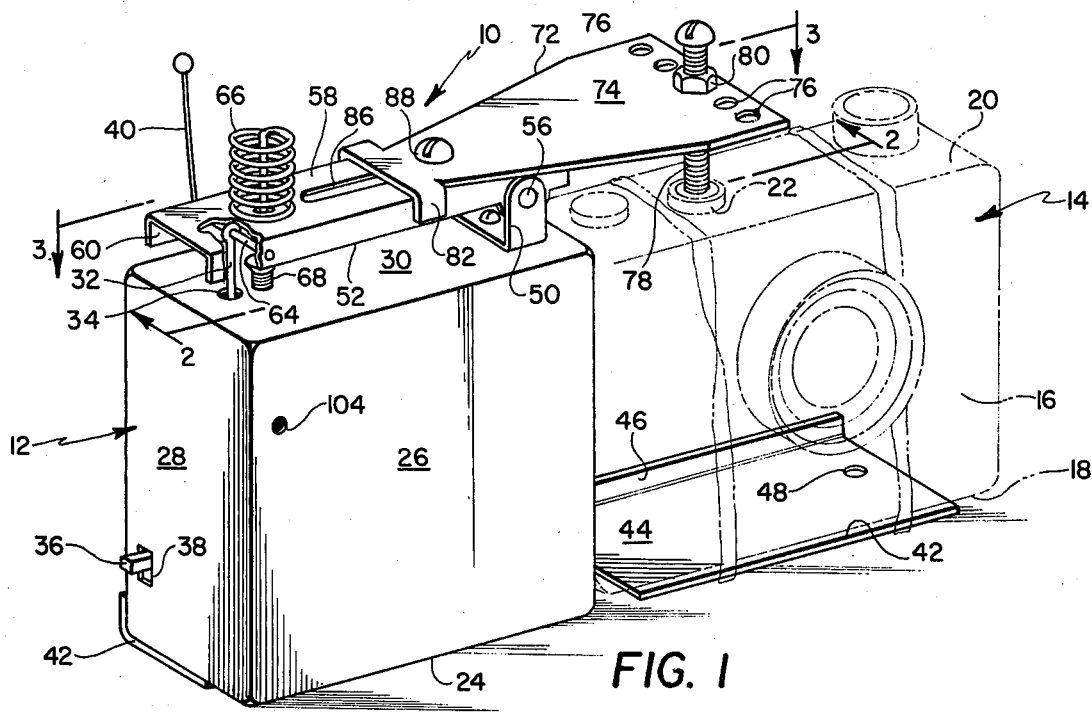
FIG. 1 is a perspective view showing the device of the present invention associated with a camera, i.e., a 35 mm type.

Turning now to the drawings and particularly to FIG. 1 thereof, the overall device 10 of the present invention is shown. Such device 10 includes a housing 12 which in turn is adapted to support a camera 14. The camera 14 may be of any conventional type (a standard 35 mm. type being depicted in FIG. 1) and includes a case 16 having a base 18 and a top surface 20. A shutter release button 22 is mounted on the top surface and is capable of actuating the camera in the normal manner when the button is depressed. The camera 14 may have a built-in or added automatic winder to advance the film such that when the button 22 is sequentially activated, sequential pictures will be taken or it may be necessary after initial depression of the button 22 to wind, that is, advance the film, in order for a second picture to be taken.

The housing 12 may be of any desired configuration but generally includes a boxlike frame 24 provided with a plurality of enclosing walls to form an interior enclosure in which an actuating motor and drive means for a purpose which will later be more evident is contained. The frame includes a front wall 26, opposed side walls 28, and top and bottom walls 30. A drive rod 32 which forms a part of the drive means is suitably connected to the motor (not shown) also housed therein. The rod 32 suitably projects through an opening 34 in the top wall 30. The batteries to drive the motor may be activated by a switch 36 extending outwardly from an opening 38 in one of the side walls 28 or in any other suitable location. The motor is activated by a predetermined signal which may be a radio signal sent from any conventional hand-held source such as a hand-held transmitter (not shown) and picked up by the antenna 40 suitably positioned on the rear wall 26. It should be brought out that the particular drive means utilized as well as the particular manner in which such is activated forms no specific part of the present invention except as included as an operative adjunct to the functioning of the present device and that such drive means and actuating devices are commercially available at radio and hobby shop outlets.

The device 10 further includes a longitudinally oriented bracket 42, one end of which is attached by conventional means to the base or other enclosing wall portions of the frame 24 and includes another end which extends outwardly to the side of the device. Such bracket 42 generally includes a planar surface 44 and an upwardly extending rear supporting wall 46 so as to form a cooperating surface for receipt of the base 18 of the camera 14. The bracket 42 may be provided with one or more openings 48 in turn aligned with a threaded opening conventially provided in the base of many cameras in order to attach the camera to the bracket in a secure manner as by a screw member or the like. Other means may be utilized in order to secure the camera 14 to the bracket including encircling elastic bands (not shown) or adhesive means provided on the upper surface of the bracket 42. In any event, the camera 14 is mounted in one of the above-described manners so as to be supported by the device 10 and position the depressable shutter release button 22 such that it is accessible generally from above such that it may be manipulated in the intended manner of the present invention.

Figure 2:
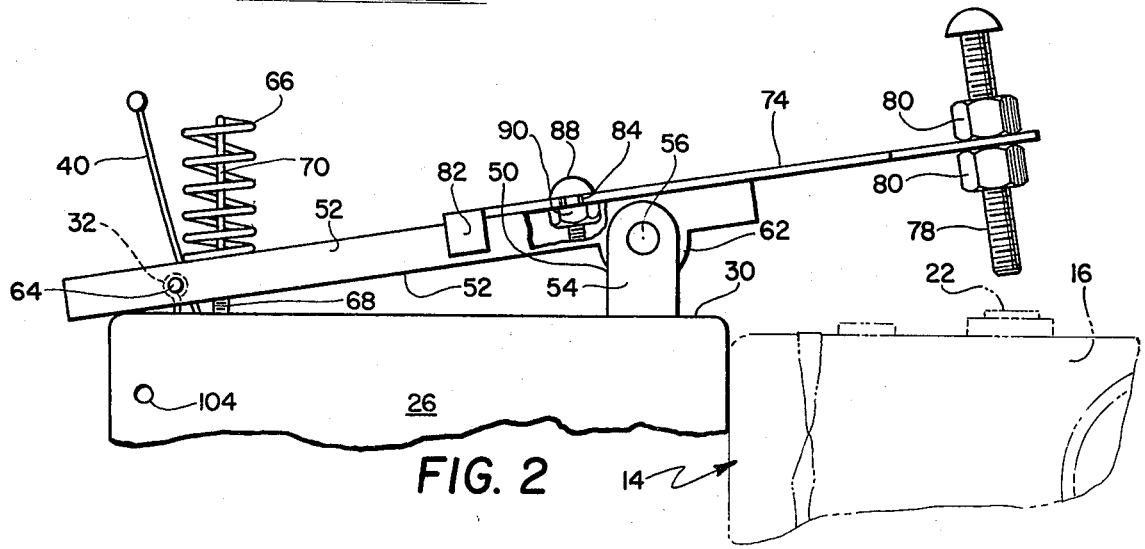
FIG. 2 is a partial side elevation view taken along the line 2—2 of FIG. 1 showing the device in its normal non-actuated or rest position.
Figure 2A:
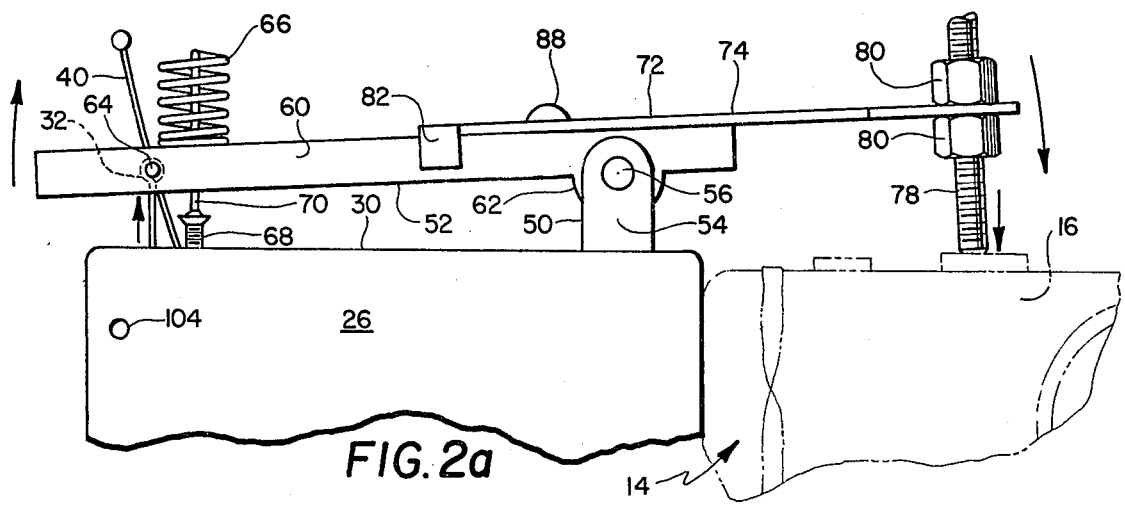
FIG. 2a is a view similar to FIG. 2 but showing the device upon actuation.

A trunnion 50 is attached to the upper wall 30 of the frame 24 and in turn supports a lever arm 52 for pivotal movement as best shown in the transition between FIGS. 2 and 2a. The trunnion includes upstanding arms 54 and a transversely extending axle 56. The lever arm 52 in turn includes a central wall 58 and downwardly extending or downwardly turned edge walls or flanges 60. Such edge walls 60 may further include ears 62 provided with openings (not shown) through which the axle 56 is adapted to extend. At the other end of the lever arm 52 a bar 64 extends between the downwardly extending flanges 60 and is in turn connected as by the bar passing through an eyelet to the drive rod 32. In addition, a spring 66 is mounted above the lever arm 52 and is adapted to engage the upper surface 58 thereof under tension by means of its attachment as by screw 68 to the upper wall 30 through a lead 70. The lever arm 52 is thus normally maintained in the position shown in FIG. 2, that is, pivoted such that the lever arm 52 is forced downwardly to the left by the action of the spring 66. It may be apparent, however, that when the drive means is actuated and the predetermined signal given so as to force the drive rod 34 upwardly, the lever arm 52 will be forced upwardly against the action of the spring and thereby force the outer end of the lever arm downwardly to the right.

A plate 72 is attached to the lever arm 52 so as to be longitudinally adjustable with regard thereto. The plate 72 is generally of flat, planar construction and terminates at its outer end in an enlarged lateral fan-shaped portion 74 provided with a series of laterally positioned openings 76 such that a threaded rod or pin 78 may be positioned thereon in a variety of different lateral positions with respect to the bracket 42. The pin 78 in turn is provided with a pair of threaded nuts 80 on either side of the plate 72 so as to provide for vertical adjustment thereof. The other end of the plate 72 is provided with attachment means by which the plate is secured to the lever arm 52. Such attachment means include a bifurcated clamp 82 adapted to contact the outer surfaces of the flanges 60. In addition, an opening 84 is provided through the plate and aligned with a longitudinally elongated slot 86 provided in the upper surface 58 of the lever arm 52. The opening 84 is to facilitate a screw 88 which passes through the opening and thence through the slot 84 so as to be engaged by a nut 90 of a larger extent than the width of the slot 86 positioned therebeneath such that the plate 72 is longitudinally adjustable with respect to the lever arm 52 by progressive tightening or loosening of the screw and nut combination 88, 90. In this manner then, it may be seen that the rod 78 may be positioned such that it directly overlies the shutter release button 22 of the camera 14 in the rest position of the lever arm such that when the lever arm is activated as shown in FIG. 2a, the rod will move downwardly to the right and activate the camera in the intended manner and that such wide variety of attitude positioning is accomplished by a simple, inexpensive, and straightforward manner in accordance with the objects of the present invention.

Figure 3:
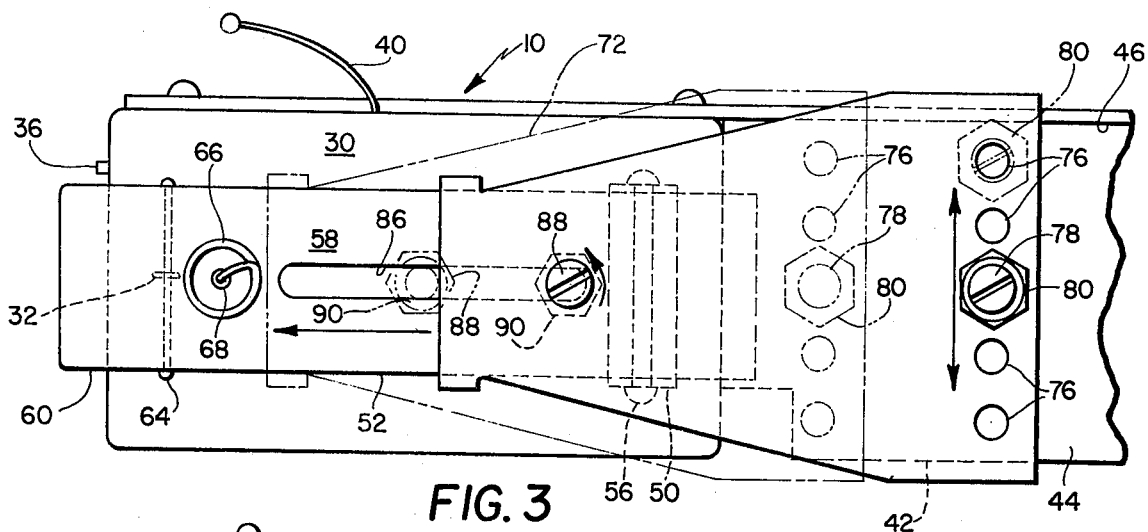
FIG. 3 is a top plan view of the device.
Figure 4:
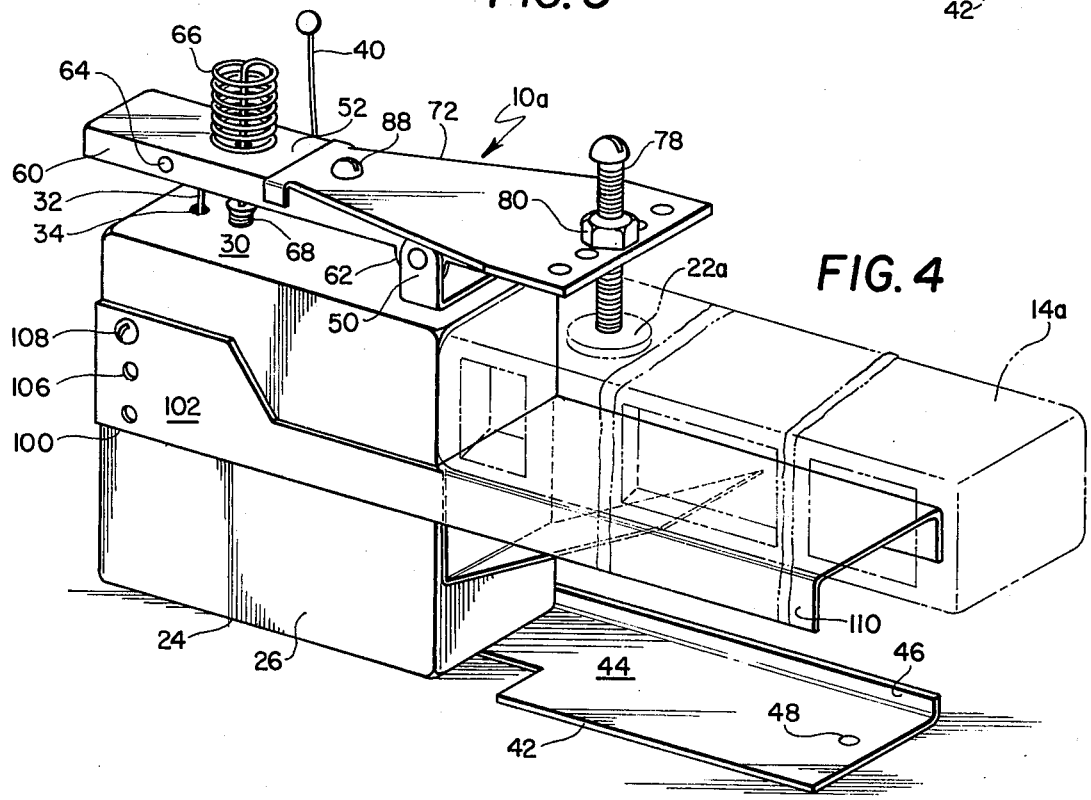
FIG. 4 is a modified form of the device provided with an adjustable camera support.

Turning now to FIG. 4 of the drawing, a modified form of the device 10a is shown wherein a secondary bracket 100 has been provided in order to facilitate the use of a different type of camera as that depicted in FIGS. 1 through 3, namely, those having a low height profile. In such regard, the secondary bracket 100 includes a pair of laterally opposed arms 102 adapted to engage the front and rear walls of the housing 24. In this regard, the front and rear walls 26 include a threaded opening 104 adapted to be aligned with a pair of a plurality of openings 106 provided in the arms 102. In this way, the arms 102 may be attached to the housing 24 by means of screws 108 and thus provided the outer supporting portion 110 at the proper height to support the modified form of the camera 14a. The overall object being the same, that is, to position the camera 14a in such a manner that the shutter actuating button 22a thereof is accessible to the actuating rod 78 in the manner as described in the previous embodiment.

It should also be brought out that the device of the present invention could be alternatively mounted, i.e., on the face wall 26 when the camera's shutter actuation button is positioned on the front wall of the camera.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for the remote controlled actuation of a camera of the type having a depressible shutter button disposed on an outer surface thereof, said device comprising a housing, a bracket outwardly extending from said housing and on which the base of said camera is adapted to rest, means associated with said bracket for releasible positioning said camera thereon, a lever arm pivotally mounted on said housing and adapted to be driven at one end thereof by drive means mounted in said housing and operable upon a predetermined signal, a plate adjustably attached to said lever arm and adapted to extend outwardly over said bracket, said plate longitudinally slidable with respect to said lever arm, an actuation pin vertically adjustably mounted at the outer end of said plate, said pin further being adjustably movable back and forth along the width of said plate such that said actuation pin can be disposed in a variety of positions including one directly above the depressible shutter button of the camera supported by said bracket such that actuation of said drive means by said predetermined signal moves said plate outer end downwardly so that said pin contacts and depresses said button.

2. The device of claim 1, wherein said bracket is vertically adjustable to accommodate cameras of various height.

3. The device of claim 1, wherein said drive means is a motor and said predetermined signal is a radio signal.

4. The device of claim 1, further including means for maintaining said lever arm is a non-actuating or rest position.

5. The device of claim 4, said means for maintaining the lever arm in a rest position being a spring mounted above said one lever arm end, said spring continually urging said one lever arm end downwardly towards said housing.

6. The device of claim 1, said plate outer end having a series of laterally spaced openings adapted to receive said pin.

7. The device of claim 1, said pin being threaded and means for vertically adjusting said pin being a pair of threaded nuts attached thereto above and below said plate.

8. The device of claim 1, said plate outer end being laterally flared so as to provide a width to cover a wide range of cameras adapted for support by said bracket.

* * * * *